United States Patent
Carrette et al.

(10) Patent No.: US 7,585,479 B2
(45) Date of Patent: Sep. 8, 2009

(54) METHOD OF DEACIDIZING A GAS BY PARTLY NEUTRALIZED MULTIAMINES

(75) Inventors: Pierre-Louis Carrette, Lyons (FR); Renaud Cadours, Francheville (FR); Alexandre Gibert, Mornant (FR); Monique Prigent, Saint Genis Laval (FR); Pierre Boucot, Ternay (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 187 days.

(21) Appl. No.: 11/746,137

(22) Filed: May 9, 2007

(65) Prior Publication Data
US 2007/0264180 A1  Nov. 15, 2007

(30) Foreign Application Priority Data
May 10, 2006  (FR) .................................. 06 04103

(51) Int. Cl.
*B01D 53/40* (2006.01)
*B01D 53/48* (2006.01)
*B01D 53/50* (2006.01)
*B01D 53/52* (2006.01)
*B01D 53/62* (2006.01)

(52) U.S. Cl. .................... 423/220; 423/228; 423/242.1; 423/242.7

(58) Field of Classification Search ................ 423/220, 423/228, 242.1, 242.7
See application file for complete search history.

(56) References Cited

U.S. PATENT DOCUMENTS

| 2,600,328 | A | 6/1952 | Riesenfeld et al. |
| 4,217,238 | A | 8/1980 | Sartori et al. |
| 4,251,494 | A | 2/1981 | Say |
| 4,387,037 | A | 6/1983 | Trentham et al. |
| 7,419,646 | B2 * | 9/2008 | Cadours et al. ............. 423/220 |

* cited by examiner

*Primary Examiner*—Timothy C Vanoy
(74) *Attorney, Agent, or Firm*—Antonelli, Terry, Stout & Kraus, LLP.

(57) ABSTRACT

A method of deacidizing a gaseous effluent including acid compounds includes the following stages: a) contacting the gaseous effluent with a first fraction of an absorbent solution containing reactive compounds with at least two amine functions, so as to obtain a gaseous effluent depleted in acid compounds and a liquid effluent laden with acid compounds, b) contacting the liquid effluent obtained in stage a) with a second fraction of absorbent solution laden with molecules more acid than the acid compounds, so as to cause formation of a first liquid phase depleted in acid compounds and a second liquid phase enriched in acid compounds and laden with more acid molecules, c) separating the first phase from the second phase, and d) regenerating the second phase so as to release a gas stream rich in acid compounds and a liquid stream poor in acid compounds and laden with more acid molecules.

9 Claims, 1 Drawing Sheet

METHOD OF DEACIDIZING A GAS BY PARTLY NEUTRALIZED MULTIAMINES

FIELD OF THE INVENTION

Figure 1:
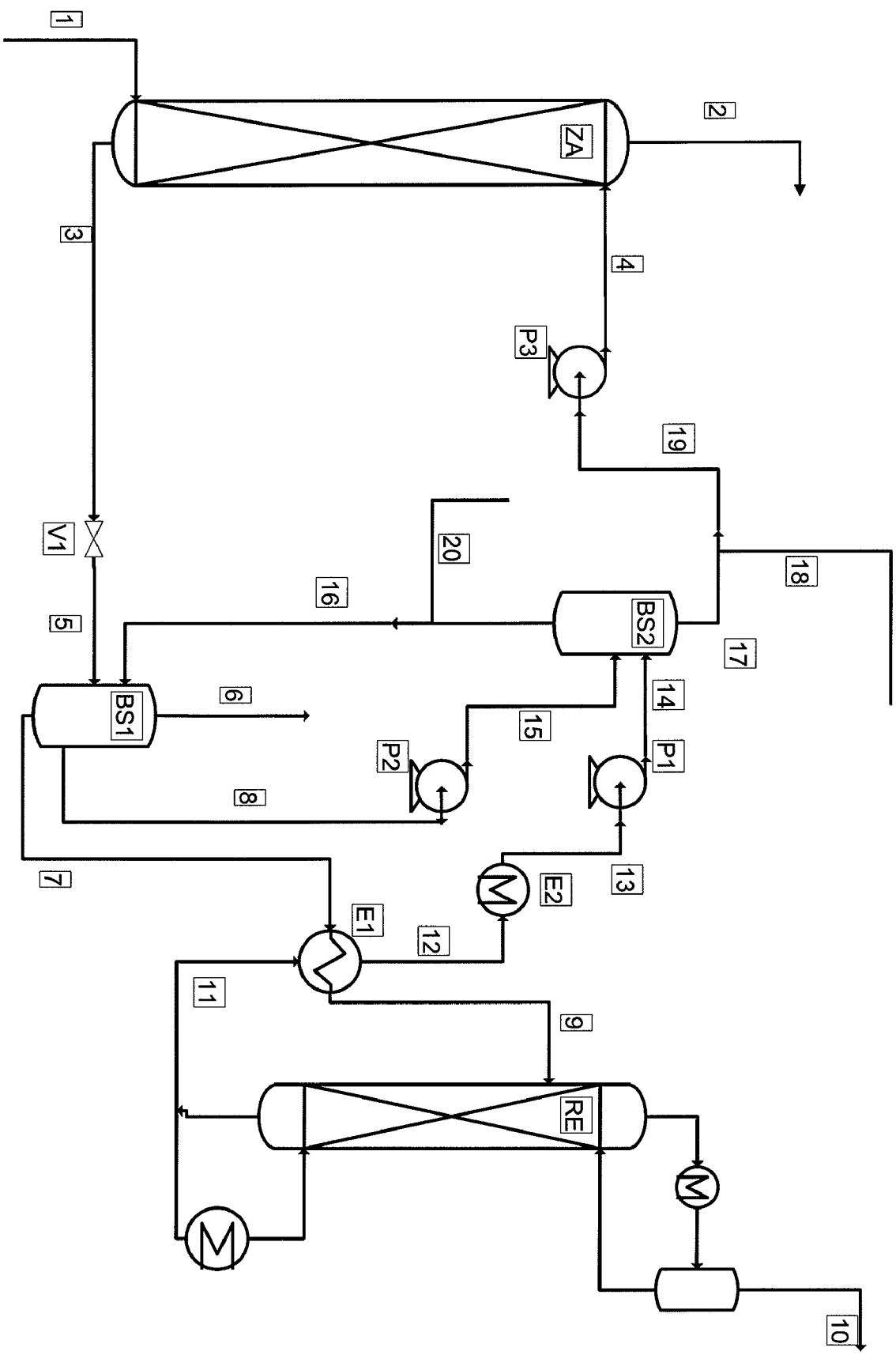

The present invention relates to the field of deacidizing a gaseous effluent.

BACKGROUND OF THE INVENTION

Deacidizing gaseous effluents such as, for example, natural gas, synthesis gas, combustion fumes, refinery gas, Claus tail gas, biomass fermentation gas, cement works gas, blast-furnace gas, is generally carried out by washing with an absorbent solution. The absorbent solution allows the acid compounds present in the gaseous effluent to be absorbed.

Deacidizing these effluents, notably decarbonation and desulfurization, imposes specific requirements on the absorbent solution:
- selectivity towards carbon dioxide in relation to oxygen and nitrogen in the case of fumes, in relation to hydrocarbons in the case of natural gas,
- thermal stability,
- chemical stability, notably towards the contaminants in the effluent, i.e. essentially oxygen, $SO_x$ and $NO_x$, and
- low vapour pressure, in order to limit absorbent solution losses at the top of the deacidizing column.

Today, the most commonly used solvents are primary, secondary or tertiary aqueous alkanolamine solutions. In fact, the $CO_2$ absorbed reacts with the alkanolamine present in solution according to a reversible exothermic reaction.

An alternative to aqueous alkanolamine solutions is the use of hot carbonate solutions. The principle is based on the absorption of the $CO_2$ in the aqueous solution, followed by the reversible chemical reaction with the carbonates. It is well known that the addition of additives allows the solvent efficiency to be optimized.

Other decarbonation methods by washing with an absorbent solution such as, for example, refrigerated methanol or polyethylene glycols, are based on a physical absorption of the $CO_2$.

In general terms, the use of all the absorbent solutions described above involves a quite significant energy consumption for regeneration of the separation agent. Regeneration of the absorbent solution is generally carried out by entrainment by a vaporized gas commonly referred to as stripping gas. The thermal energy required for regeneration is split up in three parts linked with heating of the absorbent solution between the absorption stage and the regeneration stage (sensible heat of the absorbent solution), its vaporization heat and the binding energy between the absorbed species and the absorbent solution. The binding energy is all the higher as the physico-chemical affinity between the solvent compounds and the acid compounds to be removed is high. In the particular case of alkanolamines, it is more expensive to regenerate a very basic primary alkanolamine such as MonoEthanolAmine than a tertiary amine such as MethylDiEthanolAmine. The vaporization heat of the absorbent solution has to be taken into account since the thermal regeneration stage requires vaporization of a quite significant fraction of the absorbent solution in order to obtain the stripping effect that favours elimination of the acid compounds contained in the absorbent solution. This absorbent solution fraction to be vaporized is proportional to the extent of the association between the absorbed contaminant and the absorbent solution. However, an easily vaporizable absorbent solution is penalized by absorbent solution losses by entrainment upon contact between the gas feed to be treated and the absorbent solution. The part of the sensible heat is essentially linked with the absorption capacity of the absorbent solution: it is in fact proportional to the flow rate of the absorbent solution to be regenerated. The distribution of the energy cost of the regeneration stage between the sensible heat, the vaporization heat and the absorbed gas-absorbent solution binding enthalpy essentially depends on the chemical or physico-chemical properties of the absorbent solution and of the absorbed compound.

The present invention provides a method for deacidizing a gas. The invention aims to reduce the amount of energy required for regenerating an absorbent solution laden with acid compounds.

SUMMARY OF THE INVENTION

In general terms, the invention provides a method of deacidizing a gaseous effluent comprising at least one of the acid compounds as follows: $H_2S$, mercaptans, $CO_2$, COS, $SO_2$, $CS_2$, using an absorbent solution comprising reactive compounds with at least two amine functions, wherein the following stages are carried out:
a) contacting the gaseous effluent with a first fraction of the absorbent solution, so as to obtain a gaseous effluent depleted in acid compounds and a liquid effluent laden with acid compounds,
b) contacting the liquid effluent obtained in stage a) with a second fraction of absorbent solution laden with molecules more acid than the acid compounds, so as to cause formation of a first liquid phase depleted in acid compounds and of a second liquid phase enriched in acid compounds and laden with more acid molecules,
c) separating the first phase from the second phase,
d) regenerating the second phase so as to release a gas stream rich in acid compounds and a liquid stream poor in acid compounds and laden with more acid molecules.

According to the invention, the liquid stream obtained in stage d) can be separated so as to obtain a first liquid depleted in more acid molecules and a second liquid enriched in more acid molecules, at least part of the first liquid can be recycled to stage a) as first absorbent solution fraction and at least part of the second liquid can be recycled to stage b) as second absorbent solution fraction.

The amount of more acid molecules can be adjusted so as to neutralize between 1% and 90% of one of the amine functions of the reactive compounds of the mixture obtained in stage b) by contacting the liquid effluent with the second absorbent solution fraction.

At least part of the first liquid phase obtained in stage b) can be mixed with the liquid stream obtained in stage d).

At least part of the first liquid phase obtained in stage b) can be contacted with the gaseous effluent.

The more acid molecules, in solution in water at 20° C., can have a pKa value below 6. Preferably, the acid molecules are selected from the list consisting of phosphoric acid, pyrophosphoric acid, phosphorous acid, nitrous acid, oxalic acid, acetic acid, formic acid, propanoic acid, butanoic acid, nitric acid, sulfuric acid, sulfurous acid, hydrochloric acid, amino-acids. The reactive compounds can be selected from the list consisting of N,N,N'-triethylethylenediamine, N,N,N',N',N''-pentamethyldiethylenetriamine and N,N,N',N',N''-pentamethyldipropylenetriamine.

The absorbent solution can comprise solvation compounds selected from the list consisting of water, sulfolane, N-methylpyrrolidone, glycol ethers, alkylene carbonates.

The present invention uses an absorbent solution having the property of forming two separable phases by addition of an acid that is stronger than the acid compounds of the gaseous effluent to be treated: a first phase rich in acid compounds and a second phase poor in acid compounds. This two-phase separation property allows to regenerate only the feed laden with acid compounds. Furthermore, the absorbent solution comprises multiamines that, under the invention implementation conditions, are regenerated with an optimized energy amount.

BRIEF DESCRIPTION OF THE SOLE FIGURE

Other features and advantages of the invention will be clear from reading the description hereafter, with reference to FIG. 1 that diagrammatically shows a deacidizing method with regeneration of the absorbent solution fraction containing the absorbed acid compounds.

DETAILED DESCRIPTION

In FIG. 1, the gaseous effluent to be deacidized flows in through line 1. The deacidizing method diagrammatically shown in FIG. 1 can be applied for treating various gaseous effluents. For example, the method allows to decarbonate combustion fumes, to deacidize natural gas or a Claus tail gas. The method also allows to remove the acid compounds contained in synthesis gas, in conversion gas in integrated coal or natural gas combustion plants, and in the gas resulting from biomass fermentation. Within the context of combustion fumes decarbonation, the typical composition of a gaseous effluent corresponds, by volume, to 75% nitrogen, 15% carbon dioxide, 5% oxygen and 5% water. Various contaminants such as $SO_x$, $NO_x$, Ar and other particles are also present in smaller proportions, they generally represent less than 2% by volume. The temperature of these fumes ranges between 50° C. and 180° C., the pressure is generally below 15 bars.

Natural gas essentially consists of 25% to 99% by volume of hydrocarbons, essentially methane, together with hydrocarbons having generally 2 to 6 carbon atoms. The presence of carbon dioxide in proportions ranging between 1% and 75% by volume $CO_2$ is often observed. Other contaminants, essentially sulfur compounds such as mercaptans, COS and $H_2S$, can be present in concentrations ranging from some ppm up to 50% by volume. Natural gas is generally available at pressures ranging between 20 and 100 bars, and at temperatures ranging between 20° C. and 60° C. The transportation, temperature and pressure conditions define the water content of this gaseous effluent.

Concerning Claus tail gases, their final treatment often involves hydrogenation and hydrolysis stages in order to convert all of the sulfur-containing species to hydrogen sulfide, itself collected by means of a deacidizing method using an alkanolamine-based solvent. A typical example of this method is the SCOT method. The gases to be treated during the absorption stage are available in this case at pressures often close to atmospheric pressure and at temperatures close to 50° C., conventionally ranging between 38° C. and 55° C. These gases contain on average less than 5% by volume of $H_2S$, most often less than 2%, up to 50% carbon dioxide, the rest of the gas essentially consisting of nitrogen. These gases can be saturated with water, for example they can contain about 5% by volume of water.

The other gaseous effluents requiring deacidizing for safety or transportation reasons, or according to their use, such as synthesis gas, conversion gas in integrated coal or natural gas combustion plants, gas resulting from biomass fermentation, have very variable availability conditions depending on their origin, notably as regards the temperature, pressure, composition of the gas and the acid gas concentrations.

In general terms, the acid compounds to be removed from the gaseous effluent flowing in through line 1 are Brönsted acids such as hydrogen sulfide ($H_2S$) or mercaptans, notably methylmercaptan and ethylmercaptan, and Lewis acids such as carbon dioxide ($CO_2$), sulfur dioxide ($SO_2$), or carbon oxysulfide (COS) and carbon disulfide ($CS_2$). These acid compounds are generally encountered in proportions ranging between some ppm and several percents, for example up to 75% for $CO_2$ and $H_2S$ in natural gas.

The gaseous effluent flowing in through line 1 can be available at pressures ranging between atmospheric pressure for postcombustion fumes and 150 bars, preferably 100 bars for natural gas. In the case of low-pressure gaseous effluents, a compression stage can be considered in order to reach pressure ranges favouring implementation of the present invention. The temperature of this effluent generally ranges between 0° C. and 300° C., preferably between 20° C. and 180° C., considering a natural gas as well as a combustion fume. It can however be controlled (by heating or cooling) in order to favour capture of the acid compounds by the absorbent solution.

The gaseous effluent flowing in through line 1 is contacted in absorption zone ZA with the absorbent solution flowing in through line 4. Conventional techniques for contacting a gas and a liquid can be used: bubble column, plate column, packed column, with random or stacked packing, stirred reactors in series, membrane contactors, etc.

The absorbent solution is selected for its aptitudes to absorb the acid compounds in zone ZA. The gaseous effluent depleted in acid compounds is discharged from zone ZA through line 2. The absorbent solution laden with acid compounds is discharged from zone ZA through line 3.

The absorbent solution consists of one or more compounds reacting with acid gases and of one or more solvation compounds.

The nature of the reactive compounds of the absorbent solution can be selected according to the nature of the acid compound(s) to be treated in order to allow a reversible chemical reaction with the acid compound(s) to be treated. The chemical structure of the reactive compounds can also be selected so as to furthermore obtain an increased stability for these compounds.

According to the invention, the reactive compounds of the absorbent solution are molecules comprising at least two amine functions. They can be primary, secondary, tertiary amine functions, cyclic or not, aromatic or not.

The reactive compounds preferably have the following structure:

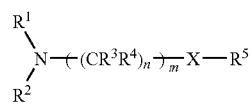

wherein:

X represents an amine function (N—$R^6$) or an oxygen atom (O) or a sulfur atom (S) or a fluorine atom (F) or a disulfide (S—S) or a carbonyl function (C=O) or a carboxyl function (O=C—O) or an amide function (O=C—N—$R^6$) or a phenyl or a nitrile function (CN) or a nitro group ($NO_2$), n and m are integers. n can have any value from 0 to 8, preferably from 0 to 6, and m any value from 1 to 7, preferably from 1 to 5, $R^5$ represents either a hydrogen atom or a hydrocarbon chain, branched or not, saturated or not, comprising 1 to 12 carbon atoms, preferably 1 to 10 carbon atoms. $R^5$ is absent when X represents a nitrile function (CN) or a nitro group ($NO_2$) or a fluorine atom (F), $R^1$, $R^2$, $R^3$, $R^4$ and $R^6$ represent either a hydrogen atom or a hydrocarbon chain, branched or not, saturated or not, comprising 1 to 12 carbon atoms, preferably 1 to 10 carbon atoms, or they have the following structure:

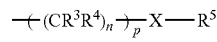

wherein:
n and p are integers. n can have any value from 0 to 8, preferably from 0 to 6, and p any value from 0 to 7, preferably from 0 to 5, X, $R^3$, $R^4$, $R^5$ and $R^6$ have the same definition as above, they can be respectively identical or different from X, $R^3$, $R^4$, $R^5$ and $R^6$ used to define the general structure of the reactive compound, $R^1$, $R^2$, $R^3$, $R^4$, $R^5$ and $R^6$ are defined so as to be possibly bound by a chemical bond in order to form cycles or heterocycles, saturated or not, aromatic or not.

By way of example, the reactive compounds can be: N,N,N'-trimethyl-N'-hydroxyethyl-bisaminoethylether, N,N-bis-(3-dimethylaminopropyl)-N-isopropanol-amine, N-(3-dimethylaminopropyl)-N,N-diisopropanolamine, N,N-dimethyl-1,3-propanediamine, N,N,N-tris(3-dimethylaminopropyl)amine, N,N,N',N'-tetramethyl-iminobispropylamine, N-(3-aminopropyl)morpholine, N-(2-aminoethyl)piperazine, bis-(2-dimethylaminoethyl)ether, 2,2-dimorpholinodiethylether, N,N'-dimethylpiperazine, N,N,N',N',N''-pentamethyldiethylenetriamine, N,N,N',N',N''-pentamethyl-dipropylenetriamine, N,N,N',N'-tetraethyl-ethylenediamine, N,N,N',N'-tetraethyl-iminobisethylamine, 1,1,4,7,10,10-hexamethyltriethylenetetramine, N,N'-di-tert-butylethylenediamine, tetraethylenepentamine, triethylenetetramine, N,N-diethyl-diethylenetriamine, N1-isopropyldiethylenetriamine, N,N-dimethyldipropylenetriamine, diethylenetriamine, N-(2-aminoethyl)-1,3-propanediamine, N-(2-aminoethyl) morpholine, 4-amino-2,2,6,6-tetramethylpiperidine, 1,2-diaminocyclohexane, 2-piperidinoethylamine, 2-(2-aminoethyl)-1-methylpyrrolidine, ethylenediamine, N,N-diethylethylenediamine, N-phenylethylenediamine, 4,9-dioxa-1,12-dodecanediamine, 4,7,10-trioxa-1,13-tridecanediamine, 1,2,4-trimethylpiperazine, N,N'-diethyl-N,N'-dimethylethylenediamine, N,N-diethyl-N',N'-dimethylethylenediamine, 1,4,7-trimethyl-1,4,7-triazacyclononane, 1,4-dimethyl-1,4-diazacycloheptane, N-(2-dimethyl-aminoethyl)-N'-methylpiperazine, N,N,N',N'-tetraethylpropylenediamine, 1-[2-(1-piperidinyl)ethyl)]piperidine, 4,4'-ethylenedimorpholine, N,N,N',N'-tetraethyl-N''-methyl-dipropylenetriamine, 4-(dimethylamino)-1,2,2,6,6-pentamethylpiperidine, 1,5,9-trimethyl-1,5,9-triazacyclododecane, 1,4,8,11-tetramethyl-1,4,8,11-tetraazacyclotetradecane, N,N'-difurfurylethylenediamine, 1,2-Bis(2-aminoethyl)thioethane, Bis(2-aminoethyl)disulfide, Bis(2-dimethylaminoethyl)sulfide, 1-amino-2-benzylaminoethane, Bis(2-diethylaminoethyl)ether, 1-dimethylamino-2-ethylmethylamino-ethoxyethane, 1,2,3-triaminopropane, N~1~-(2-aminopropyl)-1,2-propanediamine, N,N'-dibenzylethylenediamine, N'-benzyl-N,N-dimethylethylenediamine, 2-methyl-1-(3-methylphenyl)piperazine, 1-(2-pyridinyl)piperazine, N-benzyl-N',N'-dimethylethylenediamine, 3-(1-piperazino)propionitrile, 1-(4-fluorobenzyl)piperazine, 1-(2-fluorobenzyl)piperazine, 1-(2-fluorophenyl)piperazine, 1-(4-fluorophenyl)piperazine, N,N,N'-triethylenediamine, 1-[2-(dimethylamino)ethyl]piperazine, 1-cyclohexylpiperazine, 1-benzylpiperazine and 1-ethylpiperazine.

The solvation compounds can be all the compounds that dissolve in sufficient amount the reactive compounds or that are miscible with the reactive compounds described above.

The solvation compounds can be preferably water, glycols, polyethylene glycols, polypropylene glycols, ethylene glycol-propylene glycol copolymers, glycol ethers, thioglycols, thioalcohols, sulfones, sulfoxides, alcohols, ureas, lactames, N-alkylated pyrrolidones, N-alkylated piperidones, cyclotetramethylenesulfones, N-alkylformamides, N-alkylacetamides, ether-ketones, alkyl phosphates, alkylene carbonates or dialkyl carbonates and derivatives thereof. By way of non limitative water, they can be water, tetraethylene glycol dimethylether, sulfolane, N-methylpyrrolidone, 1,3-dioxan-2-one, propylene carbonate, ethylene carbonate, diethyl carbonate, diisobutyl carbonate, diphenyl carbonate, glycerol carbonate, dimethylpropyleneurea, N-methylcaprolactame, dimethylformamide, dimethylacetamide, formamide, acetamide, 2-methoxy-2-methyl-3-butanone, 2-methoxy-2-methyl-4-pentanone, 1,8-dihydroxy-3,6-dithiaoctane, 1,4-dithiane-2,5-diol, 2-(methylsulfonyl)ethanol, tetrahydropyrimidone, dimethylthiodipropionate, bis(2-hydroxyethyl)sulfone, 3-mercapto-1,2-propanediol, 2,3-dimercapto-1-propanol, 1,4-dithioerythritol, 2-mercaptobenzimidazole, 2-mercaptobenzothiazole, 2-mercaptothiazoline or tributylphosphate.

The reactive compounds can represent 10 to 100% by weight of the absorbent solution flowing in through line 4, preferably 25 to 90% by weight.

The absorbent solution can possibly also contain one or more activators for favouring absorption of the compounds to be eliminated. They can be, for example, amines, amino-acids or amino-acid alkaline salts.

The activators comprising an amine function can preferably have the structure as follows:

wherein:
X represents an amine function (N—$R^6$) or an oxygen atom (O) or a sulfur atom (S) or a fluorine atom (F) or a disulfide (S—S) or a carbonyl function (C=O) or a carboxyl function (O=C—O) or an amide function (O=C—N—$R^6$), a phenyl or a nitrile function (CN) or a nitro group ($NO_2$), n and m are integers. n can have any value from 0 to 8, preferably from 0 to 6, and m any value from 1 to 7, preferably from 1 to 5, $R^5$ represents either a hydrogen atom or a hydrocarbon chain, branched or not, saturated or not, comprising 1 to 12 carbon atoms, preferably 1 to 10 carbon atoms. $R^5$ is absent when X represents a cyano function (CN) or a nitro group ($NO_2$), or a fluorine atom (F), R¹, R², R³, R⁴ and R⁶ represent either a hydrogen atom or a hydrocarbon chain, branched or not, saturated or not, comprising 1 to 12 carbon atoms, preferably 1 to 10 carbon atoms, or they have the following structure:

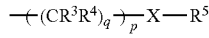

wherein:
q and p are integers. q can have any value from 0 to 8, preferably from 0 to 6, and p any value from 0 to 7, preferably from 0 to 5,
X, R³, R⁴, R⁵ and R⁶ have the same definition as above, they can be respectively identical or different from X, R³, R⁴, R⁵ and R⁶ used to define the general structure of the activator,
R¹, R², R³, R⁴, R⁵ and R⁶ are selected so as to be possibly bound by a chemical bond in order to form cycles or heterocycles, saturated or not, aromatic or not,
R¹, R² and R⁶ are selected in such a way that at least one of them represents a hydrogen atom.

The activator concentration of the absorbent solution flowing in through line 4 ranges between 0 and 30% by weight, preferably between 0 and 15% by weight of the absorbent solution.

The activators can for example be selected from the following list: monoethanolamine, diethanolamine, 2-(2-aminoethoxy)ethanol (diglycolamine), N-methylethanolamine, N-ethylethanolamine, N-propylethanolamine, N-butylethanolamine, N-(2-aminoethyl)ethanolamine, diisopropanolamine, 3-amino-1-propanol, morpholine, N,N-dimethyl-1,3-propanediamine, N,N,N',N'-tetramethyliminobispropylamine, N-(3-aminopropyl)morpholine, 3-methoxypropylamine, 3-ethoxypropylamine, N-(2-aminoethyl)piperazine, N-(3-aminopropyl)piperazine, N,N,N',N'-tetraethyliminobisethylamine, 1-phenylpiperazine, 1-formylpiperazine, ethyl 1-piperazinecarboxylate, N,N'-di-tert-butylethylenediamine, 4-ethyl-2-methyl-2-(3-methylbutyl)oxazolidine, tetraethylenepentamine, triethylenetetramine, N,N-diethyldiethylenetriamine, N~1~-isopropyldiethylenetriamine, N,N-dimethyldipropylenetriamine, dipropylenetriamine, diethylenetriamine, N-(2-aminoethyl)-1,3-propanediamine, 2,2'-(ethylenedioxy)diethylamine, N-(2-amino-ethyl)morpholine, 4-amino-2,2,6,6-tetramethylpiperidine, N-(2-aminoethyl)piperidine, N-(3-aminopropyl) piperidine, 1,2-diaminocyclohexane, N-cyclohexyl-1,3-propanediamine, 2-piperidinoethylamine, 2-(2-aminoethyl)-1-methylpyrrolidine, ethylenediamine, N,N-diethylethylenediamine, N-phenylethylenediamine, 4,9-dioxa-1,12-dodecanediamine, 4,7,10-trioxa-1,13-tridecanediamine, furfurylamine, N,N'-difurfurylethylenediamine, 1,2-Bis(2-aminoethyl)thioethane, Bis(2-aminoethyl)disulfide, Bis(aminoethyl)sulfide, 1-amino-2-benzylaminoethane, 2-(aminomethyl)thiophene, N,N-Bis(tetrahydro-2-furanylmethyl)amine, 2-(ethylsulfanyl)ethanamine, thiomorpholine, 2-[(2-aminoethyl)sulfanyl]ethanol, 2-(butylamino)ethanethiol, 1,2,3-triaminopropane, 1,3-diaminopropane, 1,4-diaminobutane, 1,5-diaminopentane, hexamethylenediamine, 1,2-propanediamine, 2-methyl-1,2-propanediamine, 2-methylpiperazine, N~2~,N~2~-dimethyl-1,2-propanediamine, N~1~,N~1~-dimethyl-1,2-propanediamine, 2,6-dimethylpiperazine, 1-ethyl-3-piperidinamine, N~1~-(2-aminopropyl)-1,2-propanediamine, decahydroquinoxaline, 2,3,5,6-tetramethyl-piperazine, N,N-dimethyl(2-piperidinyl)methanamine, 1-(2-piperidinyl-methyl)piperidine, 2,2-dimethyl-1,3-propanediamine, N~1,N~3~,2-trimethyl-1,3-propanediamine, 2-(aminomethyl)-2-methyl-1,3-propanediamine, N~1~,N~1~,2,2-tetra-methyl-1,3-propanediamine, 1-methoxy-2-propanamine, tetrahydro-2-furanylmethylamine, 2,6-dimethylmorpholine, N-methyl(tetrahydro-2-furanyl)methanamine, N-methylbenzylamine, N-ethylbenzylamine, N-propylbenzylamine, N-isopropylbenzylamine, N-butylbenzylamine, N-tertiobutylbenzylamine, N-phenetylbenzylamine, dibenzylamine, 1,2,3,4-tetrahydroisoquinoline, 1-(2-methoxyphenyl)piperazine, 2-methyl-1-(3-methylphenyl)piperazine, 1-(2-pyridinyl)piperazine, N-methyldiphenylmethanamine, benzhydrylamine, N-benzyl-N',N'-dimethylethylenediamine, 3-(methylamino) propionitrile, 3-(ethylamino)propionitrile, 3-(propylamino)propionitrile, 3-(butylamino)propionitrile, 3-(tertiobutylamino) propionitrile, 3-(pentylamino) propionitrile, 3-(hexylamino) propionitrile, 3-(cyclohexylamino)propionitrile, 3-aminopropionitrile, 3-(octylamino)propionitrile, 3-(1-piperazino)propionitrile, 2,3-difluorobenzylamines, 4-fluorobenzylamines, 2,3-difluoro-N-methylbenzylamines, 4-fluoro-N-methylbenzylamines, 1-(4-fluorobenzyl)piperazine, 1-(2-fluorobenzyl) piperazine, 2,3-fluorophenetylamines, 4-fluorophenetylamines, 1-(2-fluorophenyl) piperazine, 1-(4-fluorophenyl)piperazine, 3-fluoropyrrolidine, 3-trifluoromethylpiperidine, 4-trifluoromethylpiperidine, trifluoromethyl benzylamines, N,N,N'-triethylethylenediamine, 1-[2-(dimethylamino)ethyl]piperazine, 1-cyclohexylpiperazine, 1-benzylpiperazine and 1-ethylpiperazine.

The absorbent solution can also contain one or more salts so as to favour the phenomenon of separation of the absorbent solution into two phases, notably in BS1 and BS2. These salts can be, by way of non limitative example, alkaline, alkaline-earth, metal, amine, amino-acid salts or a mixture thereof. The associated anion can be, by way of non limitative example, a halogenide, a phosphate, a pyrophosphate, a sulfite, a sulfate, a hypochlorite, a nitrate, a nitrite, a phosphite, a carboxylate or a mixture. Examples thereof are ammonium sulfate, ammonium phosphate or ammonium sulfite. These salts can also result from the partial degradation of the absorbent solution, for example as a result of the reaction of the reactive compounds with a contaminant in the gas treated. The salts can also be obtained after introduction of soda or potash to neutralize acids formed in the plant in which the method is applied. Besides, addition of salts can possibly be avoided in cases where the activators, the reactive compounds or any other additive come by nature in form of salts. The salt concentration can be adjusted to the conditions of use.

The absorbent solution can also contain anti-corrosion and/or anti-foaming additives. Their nature and concentration are selected depending on the nature of the absorption solvent used, of the feed to be treated and on the conditions of use. Their concentration in the absorbent solution typically ranges between 0.01% and 5% by weight.

The absorbent solution discharged through line 3 can be expanded, for example through expansion valve V1. It is then fed into contacting zone BS1 through line 5.

An absorbent solution fraction laden with acids that are stronger than the acid compounds present in the effluent to be treated is fed into BS1 through line 16. Contacting of the absorbent solution laden with acid compounds flowing in through line 3 with the absorbent solution fraction laden with stronger acids flowing in through line 16 facilitates formation and separation of two liquid phases. A two-phase mixture is obtained in BS1.

In the present invention, acids that are stronger than the acid compounds of the gaseous effluent are used. In the description hereafter, they are referred to as strong acids. According to the invention, strong acids having a pKa value below 6 in water at 20° C. are preferably used. In the case of molecules with several acidities, the strongest is considered.

By acido-basic reaction, these strong acids neutralize at least partly an amine function of one of the reactive compounds present in the absorbent solution. The acids used can be, by way of non limitative example, phosphoric acid, pyrophosphoric acid, phosphorous acid, nitrous acid, oxalic acid, acetic acid, formic acid, propanoic acid, butanoic acid, nitric acid, sulfuric acid, sulfurous acid, hydrochloric acid, aminoacids or a mixture.

In case of application of the method according to the invention to the absorption of the carbon dioxide of combustion fumes, natural gas, cement works gas or blast-furnace gas, the treatment of Claus tail gas or the desulfurization of natural gas and refinery gas, an absorbent solution having one of the compositions as follows can be used:

N,N,N',N',N"-pentamethyldiethylenetriamine/water+ $H_2SO_4$,

N,N,N',N',N"-pentamethyldipropylenetriamine/water+ $H_2SO_4$,

N,N,N'-triethylethylenediamine/water+$H_3PO_4$.

Zone BS1 can be a separating drum or any other equipment for contacting two liquid fractions. Conventional techniques for contacting two little or non miscible liquids can be used: plate column, packed column, with random or stacked packing, pulse column, mixer settler in series, etc. The equipment can be selected depending on the physico-chemical properties of the two solutions.

As a result of the expansion of the absorbent solution from absorption zone ZA, a gas fraction can possibly be released and discharged through line 6. It can consist of hydrocarbons, for example in the case of natural gas and/or acid compounds deacidizing. Depending on its composition, this gaseous effluent can be recycled by being mixed with the feed flowing in through line 1 after being compressed, or sent to the top of zone RE, or be used as fuel gas possibly after being treated.

Contacting in BS1 the solutions introduced through lines 5 and 16 causes formation of two liquid phases: a first phase depleted in acid compounds from the gaseous effluent, depleted in strong acids and enriched in unreacted absorbent solution reactive compounds, and a second phase enriched in acid compounds from the gaseous effluent, enriched in strong acids and depleted in unreacted absorbent solution reactive compounds.

Although, in ZA, the acid compounds react with the most basic amine function of the reactive compounds, in BS1 these acid compounds are displaced to a less basic function of this reactive compound. In fact, strong acids neutralize the most basic amine function of the reactive compounds of the phase enriched in acid compounds. According to the invention, the amount of strong acid fed into BS1 is adjusted so as to neutralize a maximum amount of the most basic amine functions of this phase. This is why, in BS1, the strong acid concentration is preferably such that it allows to neutralize 1 to 90% of the most basic amine function present in one of the reactive compounds of the two-phase mixture, preferably 1 to 75% and ideally 5 to 60%. The binding energy between the absorbed species, i.e. the acid compounds, and the reactive compounds of the absorbent solution is thus lowered.

Furthermore, the strong acid present in the phase to be regenerated favours regeneration in RE by shift of the equilibrium of the reaction between the reactive compound of the absorbent solution, i.e. the multiamine, and the absorbed species, i.e. the acid compound.

Separation of the phases is carried out in zone BS1 by means of the density difference between the two phases. For example, separation can be performed by decantation, centrifugation, ... The liquid-liquid separation carried out in BS1 allows to recover the fraction of solution rich in unreacted solvent compounds. It is discharged through line 8. A stage of regeneration by expansion and/or thermal regeneration, not shown in FIG. 1, can be carried out to control the acid gas content of this liquid effluent prior to recycling it to the process. The phase rich in acid compounds is discharged from BS1 through line 7. This solution fraction containing the major part of the acid compounds collected in absorption zone ZA is sent to the regeneration section. According to the pressure level of the gaseous effluent treated, and therefore to the pressure level of the solution discharged through line 7, regeneration can be carried out in a succession of expansion stages, or by thermal regeneration of the solution or by a combination of expansions and thermal regenerations. FIG. 1 shows an example of thermal regeneration. The solution flowing in through line 7 is heated in exchanger E1, then fed through line 9 into a regeneration column RE. The acid compounds released in RE by inversion of the reactions carried out in ZA are discharged from RE through line 10. Regeneration is performed under selected conditions so as to release only the acid compounds coming from the feed effluent. On the other hand, the strong acids remain in the liquid phase in the absorbent solution. The absorbent solution depleted in acid compounds and rich in strong acids is discharged through line 11. According to the strong acids and residual acid compounds concentration, the solution discharged through line 11 can be a single-phase or a two-phase solution.

This solution discharged through line 11 can be used in exchanger E1 to heat the solution flowing in through line 7. At the outlet of E1, the solution can possibly be fed through line 12 into exchanger E2 for a last temperature adjustment. Then, the solution is sent through lines 13 and 14 and by means of pump P1 to separation zone BS2. In connection with FIG. 1, the liquid fraction rich in compounds that did not react with the acid compounds in ZA and recovered in BS1 through line 8 can be sent by means of pump P2 and through line 15 to zone BS2. Two liquid fractions are separated in BS2: first fraction depleted in strong acids and a second fraction enriched in strong acids.

The absorbent solution fraction depleted in strong acids is discharged from BS2 through line 17 and sent to pump P3 through line 19, possibly after makeup compound supply through line 18. The solution from pump P3 is sent to ZA through line 4.

The second liquid fraction obtained in BS2 is recycled to BS1 through line 16, possibly after makeup compound supply through line 20.

These makeup compound supplies through lines 18 and 20 allow to compensate for the losses in various compounds of the absorbent solution. The amount of strong acids is notably adjusted by adding makeup strong acids through line 20.

Alternatively to the diagram of FIG. 1, part or all of the liquid fraction rich in reactive compounds that did not react with the acid gases in ZA and recovered in BS1 through line 8 can be fed through line 15 into absorption zone ZA. In this case, the temperature of this fraction can be controlled. Similarly, this solvent fraction sent back to ZA can be provided with makeup compounds. In this embodiment, absorption zone ZA is supplied with absorbent solution through lines 4 and 15. The position of the various feed points is selected according to the compositions of these absorbent solutions, notably according to the residual acid compound amounts. In general terms, absorption zone ZA can have more than two liquid feed points, for example in case of regeneration by expansion and/or thermal regeneration of the liquid fraction discharged through line 7. Each expansion and/or thermal regeneration stage can produce a liquid fraction likely to be sent to absorption zone ZA after a succession of possible operations such as: temperature control, makeup compound supply, phase separation, pressure rise, etc.

According to another embodiment of the invention, zones BS1 and BS2 can be combined within a single equipment, for example a liquid-liquid contacting column. The numerical example hereafter illustrates the technical relevance of the present invention.

The absorbent solution is prepared as follows. An aqueous wt. 70% N,N,N',N',N''-pentamethyldipropylenetriamine solution is prepared. 31% of its most basic amine function is neutralized by addition of a concentrated phosphoric acid solution. The absorbent solution demixes and forms two phases. A first fraction with a 1.5% amine neutralization rate by the phosphoric acid is contacted with a gas stream of composition $CO_2/N_2$ vol. 10/90% at 40° C. After absorption of the $CO_2$, this fraction is mixed with the second fraction rich in products from the reaction between the multiamine and the phosphoric acid. A two-phase mixture forms. A first fraction representing wt. 57% of the mixture is depleted in products from the reaction with $CO_2$ (0.7% neutralization rate by the $CO_2$). The second fraction representing wt. 43% of the mixture contains the major part of the $CO_2$ absorbed: its $CO_2$ neutralization rate is 50%. Therefore, the implementation of the present invention has the advantage of regenerating only wt. 43% of the absorbent solution used. The rate of neutralization of this phase by $H_3PO_4$ being 115%, it is definitely the second amine function (less basic than the first one) that has to be regenerated to release the $CO_2$.

The invention claimed is:

1. Method of deacidizing a gaseous effluent comprising at least one of the acid compounds as follows: $H_2S$, mercaptans, $CO_2$, COS, $SO_2$, $CS_2$, using an absorbent solution comprising reactive compounds with at least two amine functions, wherein the following stages are carried out:
   a) contacting the gaseous effluent with a first fraction of the absorbent solution, so as to obtain a gaseous effluent depleted in acid compounds and a liquid effluent laden with acid compounds,
   b) contacting the liquid effluent obtained in stage a) with a second fraction of absorbent solution laden with molecules more acid than the acid compounds, so as to cause formation of a first liquid phase depleted in acid compounds and of a second liquid phase enriched in acid compounds and laden with more acid molecules,
   c) separating the first phase from the second phase,
   d) regenerating the second phase so as to release a gas stream rich in compounds and a liquid stream poor in acid compounds and laden with more acid molecules.

2. A method as claimed in claim 1, wherein the liquid stream obtained in stage d) is separated so as to obtain a first liquid depleted in more acid molecules and a second liquid enriched in more acid molecules, wherein at least part of the first liquid is recycled to stage a) as first absorbent solution fraction, and wherein at least part of the second liquid is recycled to stage b) as second absorbent solution fraction.

3. A method as claimed in claim 1, wherein the amount of more acid molecules is adjusted so as to neutralize 1% to 90% of one of the amine functions of the reactive compounds of the mixture obtained in stage b) by contacting the liquid effluent with the second absorbent solution fraction.

4. A method as claimed in claim 1, wherein at least part of the first liquid phase obtained in stage b) is mixed with the liquid stream obtained in stage d).

5. A method as claimed in claim 1, wherein at least part of the first liquid phase obtained in stage b) is contacted with the gaseous effluent.

6. A method as claimed in claim 1, wherein said more acid molecules, in solution in water at 20° C., have a pKa value below 6.

7. A method as claimed in claim 1, wherein the acid molecules are selected from the list consisting of phosphoric acid, pyrophosphoric acid, phosphorous acid, nitrous acid, oxalic acid, acetic acid, formic acid, propanoic acid, butanoic acid, nitric acid, sulfuric acid, sulfurous acid, hydrochloric acid, amino-acids.

8. A method as claimed in claim 1, wherein said reactive compounds are selected from the list consisting of N,N,N'-triethylethylenediamine, N,N,N',N',N''-pentamethyidiethylenetriamine and N,N,N',N',N''-pentamethyldipropylenetriamine.

9. A method as claimed in claim 1, wherein the absorbent solution comprises solvation compounds selected from the list consisting of water, sulfolane, N-methylpyrrolidone, glycol ethers, alkylene carbonates.

* * * * *